United States Patent [19]

Watanabe

[11] Patent Number: 4,567,946
[45] Date of Patent: Feb. 4, 1986

[54] INCREASING THE PERMEABILITY OF A SUBTERRANEAN RESERVOIR

[75] Inventor: David J. Watanabe, Orange, Calif.

[73] Assignee: Union Oil Company of California, Los Angeles, Calif.

[21] Appl. No.: 620,057

[22] Filed: Jun. 13, 1984

Related U.S. Application Data

[63] Continuation-in-part of Ser. No. 346,542, Feb. 8, 1982, abandoned, which is a continuation-in-part of Ser. No. 215,007, Dec. 10, 1980, abandoned.

[51] Int. Cl.$^4$ ............................................. E21B 43/27
[52] U.S. Cl. ............................... 166/307; 252/8.55 C
[58] Field of Search .................. 252/8.55 C, 8.55 B; 166/307

[56] References Cited

U.S. PATENT DOCUMENTS

| | | | |
|---|---|---|---|
| 2,689,230 | 9/1954 | Cardwell et al. | 252/8.55 |
| 2,824,833 | 2/1958 | Cardwell et al. | 252/8.55 |
| 3,179,171 | 4/1965 | Beale | 166/308 X |
| 3,233,672 | 2/1966 | Carpenter | 166/307 X |
| 3,826,312 | 7/1974 | Richardson et al. | 252/8.55 X |
| 3,892,275 | 7/1975 | Lybarger et al. | 166/307 X |
| 3,920,566 | 11/1975 | Richardson et al. | 252/8.55 |
| 3,924,684 | 12/1975 | Tate | 166/307 |

*Primary Examiner*—Herbert B. Guynn
*Attorney, Agent, or Firm*—Dean Sandford; Gregory F. Wirzbicki; Robert A. Franks

[57] ABSTRACT

The permeability of high-temperature subterranean hydrocarbon-producing reservoirs is increased by introducing therein a mixture containing a tertiary carboxylic acid alkylated amide, an aqueous solution of an acid or acids, and a water-soluble polymer, preferably a nitrogen-containing polymer.

22 Claims, No Drawings

INCREASING THE PERMEABILITY OF A SUBTERRANEAN RESERVOIR

CROSS REFERENCE TO RELATED APPLICATIONS

This application is a continuation-in-part of copending application, Ser. No. 346,542, filed Feb. 8, 1982, now abandoned which itself is a continuation-in-part of Ser. No. 215,007, filed Dec. 10, 1980 and now abandoned.

BACKGROUND OF THE INVENTION

1. Field of the Invention

This invention relates to a composition and method for treating the matrix around a well to increase the productivity of the well. More particularly, the invention relates to a composition and method which are especially suitable for treating high-temperature hydrocarbon-producing sandstone and carbonate reservoirs, and which are useful for removing acid soluble clays and other siliceous fines and/or carbonate deposits from the matrix around a well. More particularly still, the invention relates to an acidizing composition whose rate of reaction on such clays and other siliceous fines and/or carbonate deposits is retarded.

2. Description of the Art

It is often desired to increase the permeability of a subterranean reservoir penetrated by well so that a fluid can flow more easily through the reservoir and into the well. Many reservoirs originally have narrow pore throats due to the nature and configuration of the reservoir rock. Such pore throats become plugged or partially plugged with clays and other siliceous fines and/or carbonate deposits, particularly in the matrix around a well, due to the concentrated radial flow of fluids therethrough. The plugging material can either shift position, swell, or otherwise change in character when contacted by fluids flowing through the reservoir.

Previously, various compositions have been proposed for treating subterranean reservoirs to increase their permeability. Among these are numerous acidizing solutions for removing clays and other siliceous fines and/or carbonate deposits from the matrix. Acidizing is an especially widely practiced process for increasing or restoring the permeability of subterranean reservoirs to facilitate the flow therethrough of formation fluids, including oil and gas, and injected fluids such as enhanced recovery drive fluids. Acidizing involves injecting into the reservoir an acid or acids, typically hydrochloric acid, or hydrochloric acid followed by hydrofluoric acid, in order to dissolve plugging or partially plugging carbonate deposits, or clays and other siliceous fines in the matrix, thereby opening and enlarging pore throats and other flow channels so that the effective porosity or permeability of the reservoir is increased.

One problem in acidizing even moderately high temperature reservoirs encountered in petroleum-producing wells is that the acid is rapidly consumed by the reacting material immediately adjacent to the wellbore before the acid can penetrate any significant distance into the matrix. Without adequate penetration into the matrix, the acidizing operation can be of little value in treating the reservoir.

Relatively high well temperatures (above 100° F.) render the acidizing solution especially corrosive to well hardware. Corrosion inhibitors which effectively control corrosion at moderate well temperatures can become less effective and sometimes break down completely at elevated temperatures, such as above about 200° F. Another difficulty with the known corrosion inhibitors, especially when used in the large quantities required in higher temperature wells, is their tendency to form insoluble solid residues upon decomposition, thereby damaging the reservoir permeability.

In view of these problems, the prior art acidizing methods are limited, as a practical matter, to the acidizing of reservoirs having temperatures on the order of about 200° F. and less.

Many prior art references describe acidizing or other compositions for injection into reservoirs. As an illustration, compositions containing various amides or amide derivatives have previously been suggested for introduction into reservoirs as part of an acidizing or other treatment. One such composition is disclosed in U.S. Pat. No. 3,826,312 to Richardson which covers a self-neutralizing well acidizing composition containing hydrochloric acid and a slow reactive pH increasing material such as an organic acid amide, for example formamide and acetamide, which increases the pH of the solution to neutral after a relatively prolonged length of time after injection.

U.S. Pat. No. 3,892,275 to Lybarger et al. describes a thickened aqueous well treating fluid for gravel packing, fracturing, fluid diverting, selective plugging, and fluid displacement. The composition is an aqueous liquid containing a cellulose ether thickener, an acidifying material, and a slow reactive pH increasing material. The acidizing material may be hydrochloric acid, present in sufficient quantity to decrease the solution viscosity of the system after a selected time-temperature exposure. The slow reactive pH increasing material may be a lower organic acid amide, for example formamide, dimethylformamide, or acetamide, which increases the pH of the solution to neutral after a substantial length of time.

U.S. Pat. No. 2,265,759 to Lawton et al. discloses a method for treating a well with an acid, such as hydrochloric acid, and a wetting agent which intensifies the action of the acid in dissolving oil-saturated calcareous deposits. Suitable wetting agents include onium salts such as the amidols of coconut oil fatty acids.

U.S. Pat. No. 2,238,671 to Woodhouse describes a method for increasing the fluid flow from oil wells by injecting therein an acidizing solution comprising an aqueous solution of a readily hydrolyzable amide such as formamide, acetamide, hydroxy acetamide, methoxy acetamide, diglycol urea, and isobutoxy acetamide.

U.S. Pat. No. 2,824,833 to Cardwell et al. shows a hydrochloric acid acidizing solution containing a water-soluble gum thickener, such as karaya, tragacanth, and the like.

U.S. Pat. No. 3,179,171 to Beale, Jr. describes a hydrochloric acid acidizing solution containing a polymer such as polyvinylpyrrolidone.

In spite of the success of some of these aforementioned treatments, the need exists for a further improved well treating composition and method for use thereof to increase the permeability of a subterranean reservoir, especially a reservoir containing clays and other siliceous and/or carbonate deposits plugging or partially plugging narrow pore throats in the matrix around the well.

Accordingly, it is a principal object of this invention to provide a composition and method for increasing the permeability of a subterranean reservoir by removing therefrom plugging and partially plugging clays and other siliceous fines and/or carbonate deposits from narrow pore throats in the matrix around the well.

A further object of the invention is to provide an acidizing composition, optionally including a conventional corrosion inhibitor, and a method of using said composition wherein the rate of reaction of the acidizing composition on materials in the reservoir even at a relatively high temperature is retarded.

Another object of the invention is to provide such a composition and method wherein the depth of penetration of the acidizing composition into the reservoir even at a relatively high temperature is increased.

Still another object of the invention is to provide an acidizing composition and method which cause a minimum of corrosion damage to the hardware in the well through which the said acidizing composition passes when being injected into the said reservoir.

Yet another object of the invention is to provide an acidizing composition and method which cause a minimum of corrosion damage to the hardware in the well through which the acidizing composition passes into the said reservoir wherein a conventional corrosion inhibitor is rendered ineffective or partially ineffective due to high temperatures or other causes, such as a mutual solvent removing the inhibitor from hardware surfaces.

Yet another object of the invention is to provide an acidizing composition and method wherein the acidizing composition preferentially seeks and enters oil- and gas- bearing zones for stimulation, rather than water-bearing zones.

Other objects, advantages and features will become apparent from the following description.

SUMMARY OF THE INVENTION

Briefly, the invention provides a composition and method for increasing the permeability of a subterranean reservoir, especially a reservoir having a temperature of up to about 400° F., wherein there is introduced into the reservoir, via a well penetrating the reservoir, a retarded acidizing composition preferably comprising a mixture of about 0.5 to 2.5 chemical equivalents of a tertiary carboxylic acid alkylated amide characterized by the formula:

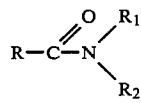

wherein (1) R is hydrogen or an alkyl group containing 1 to about 8 carbon atoms and (2) $R_1$ and $R_2$ are the same or different alkyl groups containing 1 to about 8 carbon atoms, which amide is a proton-carrying mutual solvent, to about 1 chemical equivalent of one or more water-soluble acids, usually selected from the group consisting of low molecular weight organic acids, hydrochloric acid, hydrofluoric acid, mixtures of hydrochloric acid and water-soluble ammonium fluoride or bifluoride salts, and admixtures thereof. The composition further includes about 100 to about 10,000 parts per million by weight of a water-soluble polymer selected from the group consisting of polyacrylamide, partially hydrolyzed polyacrylamide, vinylpyrrolidone polymers, polyalkene oxide, heteropolysaccharide produced by bacteria of the genus Xanthomonas, cellulose ether, and natural gum. Nitrogen-containing polymers are preferred.

DETAILED DESCRIPTION OF THE INVENTION

The composition and method of this invention are suitable for acidizing the matrix around a well, especially in moderately high temperature reservoirs, such as those having a temperature of 100° F. to about 400° F., and especially about 200° F. to 400° F. By proper selection of the acidizing solution described more fully hereinafter, the composition and method of this invention are suitable for acidizing reservoirs containing carbonate deposits in limestone and dolomite formations, as well as clay and other siliceous fines in sandstone formations.

The acidizing composition of this invention is made up in part by a proton-carrying mutual solvent, which comprises a tertiary carboxylic acid alkylated amide which can react with a proton as shown by the following reaction:

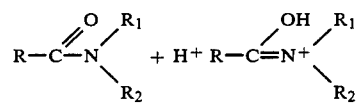

wherein (1) R is hydrogen or an alkyl group containing 1 to about 8 carbon atoms, and (2) $R_1$ and $R_2$ are the same or different alkyl groups containing 1 to about 8 carbon atoms. Preferred alkylated amides are N,N-diethylacetamide, N,N-dipropylacetamide, N,N-dimethylpropionamide, and N,N-diethylpropionamide. Other alkylated amides which may be used include N-methyl,N-ethylacetamide, N-methyl,N-octylpropionamide, N-methyl,N-hexyl-n-butyramide, N-methyl,N-propylcapromamide, N,N-diethylcaprylamide, and the like. N,N-dimethylformamide, hereinafter referred to as DMF, is especially preferred.

The alkylated amides may be prepared by any one of several methods which are well known in the art such as the reaction of an acyl chloride, acyl anhydride, or carboxylic acid with a secondary amine.

The tertiary carboxylic acid alkylated amide reacts with acids to form a cationic complex ion by capturing a proton from the acid. This complexing effect reduces the corrosion that otherwise would occur when the proton or acid directly contacts the well hardware when the composition is injected into a reservoir via the well. However, when injected into a reservoir, especially a reservoir having a temperature of about 100° to 400° F., the complex ion releases the proton or acid gradually and completely without reducing the total available proton or acid for acidizing the reservoir. This proton or acid is then available for reacting with carbonate deposits and/or clays and other siliceous fines plugging or partially plugging narrow pore throats in the matrix around the well. Thus, the complex ion can be injected a substantial distance into the matrix around the well before all of the proton or acid re-forms, reacts and spends. Therefore, the amide is capable of controlling corrosion in a well and improving the permeability of the matrix up to a substantial distance away from a wellbore rather than reacting with material immediately adjacent the wellbore as is characteristic of many previously used acidizing compositions. This same tertiary carboxylic acid alkylated amide also serves as a mutual solvent between the acid solution and hydrocarbons wherein the acidizing composition tends to seek preferentially oil- and gas-bearing zones rather than water-bearing zones.

The composition of the invention comprises an aqueous solution containing the tertiary carboxylic acid alkylated amide, an acid, for example a low molecular weight organic acid, hydrochloric acid, hydrofluoric acid, mixtures of hydrochloric acid and water-soluble ammonium fluoride or bifluoride salts, and admixtures thereof, and a water-soluble polymer.

Suitable low molecular weight organic acids include those having from 1 to about 6 carbon atoms, such as formic, acetic, citric, and tartaric acids. Halogenated organic acids such as mono-, di- and trichloracetic acids can also be used.

Aqueous solutions of hydrochloric acid employed will ordinarily contain about 5 to 28 percent by weight hydrogen chloride. Aqueous solutions of hydrofluoric acid or fluoride salt employed will contain about 1 to 30 percent by weight fluoride ion. The organic acids will generally be used in concentrations ranging from about 10 to 80 percent by weight.

Mixtures of hydrochloric acid with hydrofluoric acid are often referred to as "mud acids" because of their ability to dissolve drilling mud particles. These acids normally have a hydrogen chloride content between about 5 and 15 percent by weight and a hydrogen fluoride content between about 2 and 6 percent by weight. They may be prepared by adding crystalline ammonium fluoride or bifluoride to hydrochloric acid. The hydrogen chloride reacts with the fluoride salt to form hydrogen fluoride and hence the more salt added the greater will be the hydrogen fluoride concentration and the lower will be the hydrogen chloride concentration. Other preparation methods, including the mixing of hydrochloric acid with hydrofluoric acid, can also be employed.

Regardless of the strength of the aqueous solutions of the various acids or salts employed, a sufficient quantity of acid is used in admixture usually containing about 0.5 to 2.5 chemical equivalents of the proton-carrying component to about 1 chemical equivalent of an acid, which acid is commonly used as an aqueous solution. Preferably, the mixture contains about 1 chemical equivalent of the proton-carrying component to about 1 chemical equivalent of the acid.

At higher reservoir temperatures, greater depth of penetration of the acidizing composition into the reservoir and control of corrosion is achieved by including in the composition about 100 to about 10,000 parts per million by weight, preferably, for polyacrylamide, about 100 to about 500 parts per million by weight, of a water-soluble polymer. Suitable polymers include polyacrylamide, partially hydrolyzed polyacrylamide, vinylpyrrolidone polymers, polyalkene oxide, heteropolysaccharide produced by bacteria of the genus Xanthamonas, cellulose ether and natural gum. The molecular weight of the above-described water-soluble polymers can vary over a wide range, e.g., 10,000 to 25,000,000. The preferred polymers have a molecular weight in excess of 1,000,000.

The polymers are believed to function by reducing the mass transfer rate in the solution to slow down the acid reaction. Especially preferred polymers are those which contain nitrogen in the polymer chain, e.g., polyacrylamide, partially hydrolyzed polyacrylamide, and vinylpyrrolidone polymers. These polymers are capable of forming a chain of cationic complex ions with acids and affect the corrosion rate and depth of penetration of live acid into the reservoir in the same manner described above in the discussion of tertiary carboxylic acid alkylated amides.

Polymers useful in the invention are commercially available. Pusher 700 polymer marketed by The Dow Chemical Company of Midland, Michigan is an example of a suitable polyacrylamide. The partially hydrolyzed polyacrylamides have up to 70 percent of the carboxamide groups originally present in the polyacrylamide hydrolyzed to carboxyl groups. Pusher 757 marketed by the Dow Chemical Company is an example of a suitable partially hydrolyzed polyacrylamide.

Vinylpyrrolidone polymers which can be employed are those having the recurring unit of the formula:

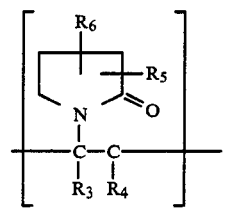

wherein $R_3$, $R_4$, $R_5$, and $R_6$ are independently selected from the group consisting of hydrogen and alkyl radicals having 1 to 5 carbon atoms. Useful alkyl radicals include methyl, ethyl, propyl, butyl, pentyl, and isomeric forms thereof. Where each of the above-described R groups are hydrogen, the resulting compound is polyvinylpyrrolidone, i.e., poly-N-vinyl-2-pyrrolidone, a preferred polymer. Polyvinylpyrrolidone 360 marketed by Aldrich Chemical Company of Milwaukee, Wisconsin is a suitable polymer.

Polyalkeneoxide is prepared by homopolymerization of a single alkene oxide, for example ethylene oxide, propylene oxide or butylene oxide. It is preferred to employ the homopolymer of polyethylene oxide such as Polyox marketed by Union Carbide Chemicals Company of New York, New York.

The heteropolysaccharides which may be used in carrying out the present invention are ionic polysaccharides produced by fermentation of carbohydrates such as starch by bacteria of the genus Xanthomonas. Kelzan MF marketed by Kelso Company of San Diego, California is a suitable hereo-polysaccharide.

Cellulose ethers which may be employed include carboxyalkylcellulose such as carboxymethylcellulose and carboxyethylcellulose, hydroxyethylcellulose and carboxymethylhydroxyethylcellulose. Natrosol 250, a hydroxyethylcellulose marketed by Hercules Incorporated of Wilmington, Delaware may be used.

Natural gums which may be used include starch; plant exudates such as arabic, tragacanth, karaya and ghatti; seeds or roots such as locust bean, guar, psyllium seed and quince seed, and seaweed extracts such as agar, algin, carrageenan and furcellaran.

The ingredients of the composition can be combined in any desired order. It is preferred to add the polymer to the aqueous acidizing solution before adding the amide.

The acidizing composition of this invention containing a tertiary carboxylic acid alkylated amide, an acid, and a water-soluble polymer also has the property of being less corrosive to hardware, metal conduits, and other metal equipment in a well with which it comes in contact, than is a similar acidizing composition without the amide component. Thus, with a suitable amount of the amide and polymer components, adequate control of corrosion can be achieved even when a conventional corrosion inhibitor is rendered ineffective or partially ineffective due to high temperatures or other causes, such as a mutual solvent removing the inhibitor from hardware surfaces. Suitable conventional corrosion inhibitors, when used, include inorganic compounds such as sodium chromate, as well as acetylenic alcohols, heterocyclic nitrogen compounds, substituted thioureas, rosin amine derivatives, quaternary ammonium compounds, and similar organic agents. Other additives may also be present. These include surface active agents designed to function as demulsifiers, wetting agents, anti-sludge agents, complexing agents intended to prevent the formation of gelatinous iron hydroxides, drag reducing agents, fluid loss control agents, diverting agents, and the like. A wide variety of additives designed to perform these and related functions are available commercially and will be familiar to those skilled in the art. The additives selected should, of course, be compatible with the particular acidizing solution employed.

When the acidizing composition of this invention includes hydrofluoric acid or an ammonium fluoride salt it is highly preferred to inject into the reservoir, prior to the injection of the acidizing composition, a preflush of about 50 to 150 gallons per vertical foot of interval to be treated comprising a slug of an acidizing composition which also contains a tertiary carboxylic acid alkylated amide but contains no hydrofluoric acid or ammonium fluoride salt. Injected fluoride ions can combine with alkali and alkaline earth metal ions present in the reservoir to form insoluble precipitates which can plug a portion of the reservoir. This precipitation decreases the effectiveness of the acidizing treatment. A preflush separates the fluoride ion-containing composition from such alkali and alkaline earth metal ions. Thus, the precipitation of fluoride salts is avoided.

It is also preferred to inject into the reservoir, following the injection of the acidizing composition, an afterflush of about 50 to 150 gallons per vertical foot of interval to be treated. The afterflush can be either an aqueous or oil solution containing about 5 to 35 percent by volume of a tertiary carboxylic acid alkylated amide. An oil afterflush will maximize the relative permeability to oil of the portion of the reservoir contacted by the afterflush. If an oil afterflush is used, it is preferred to use an oil that is clean, free of particulate matter and will not react with the acid to form a sludge. An oil afterflush should not be used in treating water injection wells because of the adverse effect of such an afterflush on the relative permeability of the reservoir to water. In gas well stimulation, a hydrochloric acid afterflush is normally used, except where bottomhole pressure is inadequate to provide cleanup, in which case a gas afterflush is preferred using either nitrogen or natural gas.

Following an acidizing treatment, the treated well or wells are generally placed back in service either as production wells or injection wells. The fluids subsequently injected into or produced through the portion of the reservoir contacted by the acidizing composition displace the spent acidizing composition. With conventional aqueous acidizing fluids, this displacement is incomplete, i.e., a portion of the treating solution tends to remain in the treated zone and can cause water-logging or water-blocking of at least some of the pores of the reservoir. When the acidizing composition of this invention is used in this manner, the tertiary carboxylic acid alkylated amide component tends to behave as a mutual solvent and improve the ability of subsequently injected or produced fluids to displace the spent acidizing solution. Thus, the amount of water-logging or water-blocking is reduced, and the permeability of the reservoir to fluids is increased.

As shown by the following Examples, the addition of a tertiary carboxylic acid alkylated amide and a polymer to an acid or acids retards the rate of reaction of the acid or acids on reacting materials. Thus, the depth of penetration into the matrix around the well by an active acidizing composition is increased. This allows an increase in the permeability to substantially greater distances from a wellbore.

EXAMPLE 1

A series of tests is made to determine the reaction rate at ambient temperature (73° F.) on calcium carbonate of 14 grams of an acidizing solution containing 1 gram hydrogen chloride, added as 5 grams of a 20 percent by weight aqueous solution, and various amounts of DMF and water, wherein the hydrogen chloride concentration is kept constant at 7.14 percent by weight in each solution. A solution containing no hydrogen chloride is run for comparative purposes. Single chips of calcium carbonate weighing 1 gram are dropped into a 20-milliliter test tube containing 14 grams of acidizing solution. The length of time required for the complete dissolution of the calcium carbonate chips to occur is visually determined. Five runs are made with each acidizing solution and the results averaged as shown in Table 1. These results show that the addition of DMF to a hydrochloric acid solution retards the rate of reaction of the acidizing solution on calcium carbonate at ambient temperature.

TABLE 1

| | | | | | | | Time (minutes) Required For Dissolution | |
|---|---|---|---|---|---|---|---|---|
| | | TIME TO DISSOLVE 1 GRAM OF CALCIUM CARBONATE EXPOSED TO VARIOUS ACIDIZING SOLUTIONS AT 73° F. | | | | | | |
| Run Number | Water (grams) | HCl (grams) | HCl (equiv) | DMF (grams) | DMF (equiv) | Ratio (equiv. HCl:equiv. DMF) | Range of 5 Runs | Average of 5 Runs |
| 1 | 5 | — | — | 5 | 0.0684 | 0:2.50 | (no reaction) | |
| 2 | 9 | 1 | 0.0274 | — | — | 1:0.00 | 27 to 40 | 33 |
| 3 | 8.5 | 1 | 0.0274 | 0.5 | 0.0068 | 1:0.25 | 27 to 42 | 34 |
| 4 | 8 | 1 | 0.0274 | 1 | 0.0137 | 1:0.50 | 32 to 52 | 48 |
| 5 | 7.5 | 1 | 0.0274 | 1.5 | 0.0206 | 1:0.75 | 48 to 63 | 56 |
| 6 | 7 | 1 | 0.0274 | 2 | 0.0274 | 1:1.00 | 70 to 102 | 90 |
| 7 | 6.5 | 1 | 0.0274 | 2.5 | 0.0343 | 1:1.25 | 81 to 120 | 100 |

TABLE 1-continued

TIME TO DISSOLVE 1 GRAM OF CALCIUM CARBONATE EXPOSED TO VARIOUS ACIDIZING SOLUTIONS AT 73° F.

| Run Number | Water (grams) | HCl (grams) | HCl (equiv) | DMF (grams) | DMF (equiv) | Ratio (equiv. HCl:equiv. DMF) | Time (minutes) Required For Dissolution Range of 5 Runs | Time (minutes) Required For Dissolution Average of 5 Runs |
|---|---|---|---|---|---|---|---|---|
| 8 | 6 | 1 | 0.0274 | 3 | 0.0411 | 1:1.50 | 93 to 161 | 122 |
| 9 | 5.5 | 1 | 0.0274 | 3.5 | 0.0480 | 1:1.75 | 123 to 194 | 151 |
| 10 | 5 | 1 | 0.0274 | 4 | 0.0548 | 1:2.00 | 178 to 238 | 211 |
| 11 | 4.5 | 1 | 0.0274 | 4.5 | 0.0617 | 1:2.25 | 225 to 380 | 288 |
| 12 | 4 | 1 | 0.0274 | 5 | 0.0684 | 1:2.50 | 233 to 410 | 341 |

EXAMPLE 2

Another series of tests is made at 400° F. using the acidizing solutions and calcium carbonate chips described in Example 1, except that there is added to the 14 grams of acidizing solution 0.005 grams Pusher 1000* polyacrylamide having a molecular weight of 1,000,000. Glass tubing reaction vessels, each of which has an inside diameter of 0.5 inch, and a length of 7.5 inches, are sealed at the bottom end and have a narrowed neck in the middle. A 14-gram sample of an acidizing solution is placed in such a glass reaction vessel below the neck. A 1-gram chip of calcium carbonate is then placed in the glass reaction vessel and comes to rest above the neck out of contact with the acidizing solution. The glass reaction vessel is then sealed at the top, wrapped with glass wool tape and placed in a steel reaction vessel. The steel reaction vessel is pressurized to 500 p.s.i.g. with nitrogen to provide the necessary external pressure outside the glass reaction vessel to prevent the sealed glass reaction vessel from bursting during subsequent heating. The steel reaction vessel is closed tight, placed in a autoclave and heated to 400° F. After the temperature has reached 400° F. the autoclave is set to a rocking motion for one hour to splash the acidizing solution up onto the calcium carbonate chip. In Runs 13 to 24 and 37 to 41, the heater is turned off as soon as the rocking motion is started. After one hour the rocking motion is stopped so that the acidizing solution no longer splashes up onto the calcium carbonate chip. The autoclave is then allowed to cool for 16 hours. In Runs 25 to 36, however, both the heating to maintain the temperature at 400° F. and the rocking motion are continued for four hours. After four hours both the heating and rocking are stopped and the autoclave is allowed to cool for 16 hours. Runs 37 to 41 are conducted as described for runs 13 to 24, except that polyacrylamide is omitted. Then, Runs 13 to 41 are all handled in the same manner, as follows: the glass reaction vessels are removed from the steel reaction vessel and placed in a refrigerator for 3 to 4 hours for further cooling. The cooled reaction vessel is then broken at the narrowed neck, the undissolved calcium carbonate chip is recovered, weighed, and weight loss is calculated. The results of these tests are shown in Table 2. These results show that the addition of polyacrylamide, or of DMF and polyacrylamide, to a hydrochloric acid solution retards the rate of reaction of the acidizing solution on calcium carbonate at 400° F.

*Marketed by the Dow Chemical Company

TABLE 2

WEIGHT LOSS OF 1 GRAM OF CALCIUM CARBONATE EXPOSED TO VARIOUS ACIDIZING SOLUTIONS AT 400° F.

| Run Number | Water(grams) | HCl(grams) | DMF(grams) | Ratio Equiv. HCl: Equiv. DMF | Length of Test (hours) | Dissolution Weight Loss of CaCO$_3$% |
|---|---|---|---|---|---|---|
| colspan: 14.005 grams Acidizing Solution Containing 0.005 gram Polyacrylamide and | | | | | | |
| — | 5 | | 5 | 0:2.50 | 1 | 0 |
| 14 | 9 | 1 | — | 1:0.00 | 1 | 100 |
| 15 | 8.5 | 1 | 0.5 | 1:0.25 | 1 | 99 |
| 16 | 8 | 1 | 1 | 1:0.50 | 1 | 79 |
| 17 | 7.5 | 1 | 1.5 | 1:0.75 | 1 | 87 |
| 18 | 7 | 1 | 2 | 1:1.00 | 1 | 72 |
| 19 | 6.5 | 1 | 2.5 | 1:1.25 | 1 | 54 |
| 20 | 6 | 1 | 3 | 1:1.50 | 1 | 39 |
| 21 | 5.5 | 1 | 3.5 | 1:1.75 | 1 | 40 |
| 22 | 5 | 1 | 4 | 1:2.00 | 1 | 37 |
| 23 | 4.5 | 1 | 4.5 | 1:2.25 | 1 | 25 |
| 24 | 4 | 1 | 5 | 1:2.50 | 1 | 18 |
| 25 | 5 | — | 5 | 0:2.50 | 4 | 0 |
| 26 | 9 | 1 | — | 1:0.00 | 4 | 100 |
| 27 | 8.5 | 1 | 0.5 | 1:0.25 | 4 | 100 |
| 28 | 8 | 1 | 1 | 1:0.50 | 4 | 100 |
| 29 | 7.5 | 1 | 1.5 | 1:0.75 | 4 | 100 |
| 30 | 7 | 1 | 2 | 1:1.00 | 4 | 97 |
| 31 | 6.5 | 1 | 2.5 | 1:1.25 | 4 | 97 |
| 32 | 6 | 1 | 3 | 1:1.50 | 4 | 73 |
| 33 | 5.5 | 1 | 3.5 | 1:1.75 | 4 | 50 |
| 34 | 5 | 1 | 4 | 1:2.00 | 4 | 47 |
| 35 | 4.5 | 1 | 4.5 | 1:2.25 | 4 | 50 |
| 36 | 4 | 1 | 5 | 1:2.50 | 4 | 34 |
| 14.000 grams Acidizing Solution Containing | | | | | | |
| 37 | 8 | 1 | 1 | 1:0.50 | 1 | 100 |

TABLE 2-continued

WEIGHT LOSS OF 1 GRAM OF CALCIUM CARBONATE EXPOSED TO VARIOUS ACIDIZING SOLUTIONS AT 400° F.

| Run Number | Water(grams) | HCl(grams) | DMF(grams) | Ratio Equiv. HCl: Equiv. DMF | Length of Test (hours) | Dissolution Weight Loss of CaCO$_3$% |
|---|---|---|---|---|---|---|
| 38 | 7 | 1 | 2 | 1:1.00 | 1 | 100 |
| 39 | 6 | 1 | 3 | 1:1.50 | 1 | 84 |
| 40 | 5 | 1 | 4 | 1:2.00 | 1 | 59 |
| 41 | 4 | 1 | 5 | 1:2.50 | 1 | 43 |

EXAMPLE 3

A series of tests is made to determine the corrosion rate at 400° F. of acidizing solutions containing a constant 1 gram of hydrogen chloride, added as 5 grams of a 20 percent by weight aqueous solution, 0.005 gram Pusher 1000* polyacrylamide, and various amount of DMF and water, on weighed and measured about 1.05 inch long, 0.45 inch wide and 0.22 inch thick API N-80 steel coupons having a surface area of about 1.53 square inches. A solution containing no hydrogen chloride is run for comparative purposes. The coupons are placed in necked glass tubing reaction vessels, and the glass reaction vessels are sealed, heated, rocked, and cooled in the acidizing solutions. Then, the coupons are removed, weighed and their weight loss calculated, in the same manner as described above for Example 2, Runs 25 to 36. The corrosion rate is then calculated in terms of pounds of the steel coupon lost per square foot of coupon area, per 4 hour test period. The results of these tests are shown in Table 3. These results show that the addition of DMF to a hydrochloric acid solution reduces the corrosion rate of the acidizing solution on N-80 steel at 400° F.

*Marketed by The Dow Chemical Company

Run 53 is for a test conducted in a manner similar to that of Run 52, except that the polyacrylamide is omitted from the acidizing solution. Considerably higher corrosion is observed without the polymer.

Acceptable corrosion rates for an acidizing job are generally less than 0.05 pounds per square foot.

EXAMPLE 4

A gas-producing well having a 120 foot thick producing interval is completed at a depth of 18,000 feet in a reservoir containing both carbonate and silicate materials and having a bottom hole temperature of 325° F. The volume of gas produced from the well has been declining to 7 million cubic feet per month from the original 10 million cubic feet per month. The decline in production is attributed to carbonate deposits and/or clay and other siliceous fines plugging or partially plugging pore throats in the matrix around the well. First, there are injected into the reservoir via the well 10,000 gallons of a preflush composition comprising 25 parts by weight of an aqueous solution of 15 percent by weight hydrochloric acid, inhibited by 75 parts by weight of N,N-dimethylformamide, and 0.05 parts by weight of Polyvinylpyrrolidone 360*. The preflush composition decreases the danger of precipitation of fluoride salts to be injected later. Next there are injected 27,500 gallons of a retarded acidizing composition comprising 50 parts by weight of an aqueous solution containing 12 percent by weight hydrochloric acid and 3 percent by weight hydrogen fluoride, 50 parts by weight of N,N-dimethylformamide, and 0.05 parts by weight of Polyvinylpyrrolidone 360*. Finally, 10,000 gallons of an afterflush composition having the same composition as the preflush composition described above are injected into the reservoir. Concurrently with each of these injections are injected 1,000 standard cubic feet of nitrogen gas per one barrel of the injected fluid, and an additional wellbore volume of nitrogen is injected following the afterflush to displace the composition into the formation. After the well is returned to production, 11 million cubic feet per month of gas are produced.

*Marketed by Aldrich Chemical Company

While various specific embodiments and modifications of this invention have been described in the foregoing specification, further modifications will be apparent to those skilled in the art. Such further modifications are included within the scope of this invention as defined by the following claims:

TABLE 3

CORROSION OF N-80 STEEL COUPONS EXPOSED TO VARIOUS ACIDIZING SOLUTIONS AT 400° F.

| Run Number | Water(grams) | HCl(grams) | DMF(grams) | Ratio Equiv. HCl: Equiv. DMF | Corrosion Rate (pounds/ft$^2$/4 hrs) |
|---|---|---|---|---|---|
| 14.005 grams Acidizing Solution Containing 0.005 gram Polyacrylamide and | | | | | |
| 42 | 5 | — | 5 | 0:2.50 | 0.000 |
| 43 | 9 | 1 | — | 1:0.00 | 0 208 |
| 44 | 8.5 | 1 | 0.5 | 1:0.25 | 0.130 |
| 45 | 8 | 1 | 1 | 1:0.50 | 0.117 |
| 46 | 7.5 | 1 | 1.5 | 1:0.75 | 0.164 |
| 47 | 7 | 1 | 2 | 1:1.00 | 0.111 |
| 48 | 6.5 | 1 | 2.5 | 1:1.25 | 0.105 |
| 49 | 6 | 1 | 3 | 1:1.50 | 0.085 |
| 50 | 5.5 | 1 | 3.5 | 1:1.75 | 0.079 |
| 51 | 4.5 | 1 | 4.5 | 1:2.25 | 0.048 |
| 52 | 4 | 1 | 5 | 1:2.50 | 0.046 |
| 14.000 grams Acidizing Solution Containing | | | | | |
| 53 | 4 | 1 | 5 | 1:2.50 | 0.246 |

I claim:
1. A retarded acidizing composition for treating the matrix around a well completed in a subterranean hydrocarbon-producing reservoir having a temperature of up to about 400° F., comprising a solution of:
   (a) a proton-carrying mutual solvent comprising a tertiary carboxylic acid alkylated amide characterized by the formula:

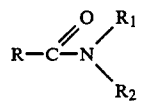

wherein: (1) R is a hydrogen or alkyl group containing 1 to about 8 carbon atoms; and (2) $R_1$ and $R_2$ are the same or different alkyl groups containing 1 to about 8 carbon atoms;
   (b) at least about 5 percent by weight of a water-soluble acid selected from the group consisting of low molecular weight organic acids, hydrochloric acid, hydrofluoric acid, mixtures of hydrochloric acid and water-soluble ammonium fluoride or bifluoride salts, and mixtures thereof; and
   (c) about 100 to about 10,000 parts per million by weight of a water-soluble polymer having a molecular weight of 10,000 to 25,000,000 and selected from the group consisting of polyacrylamide and partially hydrolyzed polyacrylamide, wherein the solution contains proton-carrying mutual solvent in an amount about 0.5 to 2.5 equivalents per equivalent of water-soluble acid.

2. The composition defined in claim 1 wherein the tertiary carboxylic acid alkylated amide is selected from the group consisting of N,N-dimethylformamide, N,N-diethylformamide, N,N-dimethylacetamide, N,N-diethylacetamide, N,N-dipropylacetamide, N,N-dimethylpropionamide, and N,N-diethylpropionamide.

3. The composition defined in claim 1 wherein the acid comprises an aqueous solution of about 5 to 30 percent by weight hydrochloric acid.

4. The composition defined in claim 1 wherein the acid comprises an aqueous solution containing about 5 to 15 percent by weight of hydrochloric acid and about 2 to 15 percent by weight of hydrofluoric acid, or a mixture of hydrochloric acid and an ammonium fluoride or bifluoride salt that provides an aqueous solution containing about 5 to 15 percent by weight of hydrochloric acid and about 2 to 15 percent by weight of hydrofluoric acid.

5. The composition defined in claim 1 wherein the composition comprises about 1 equivalent of tertiary carboxylic acid alkylated amide for each equivalent of acid.

6. An acidizing composition for increasing the permeability of a carbonate-containing subterranean reservoir having a temperature of up to about 400° F. and penetrated by a well, comprising a solution of:
   (a) N,N-dimethylformamide;
   (b) at least about 5 percent by weight of a water-soluble acid selected from the group consisting of hydrochloric acid, mixtures of hydrochloric acid and hydrofluoric acid, and mixtures of hydrochloric acid and water-soluble ammonium fluoride and/or bifluoride salts; and
   (c) about 100 to about 10,000 parts per million by weight of a water-soluble polymer having a molecular weight of 10,000 to 25,000,000 and selected from the group consisting of polyacrylamide and partially hydrolyzed polyacrylamide; wherein the solution contains N,N-dimethylformamide in a amount about 0.5 to 2.5 equivalents per equivalent of water-soluble acid.

7. The composition defined in claim 6 wherein the acid comprises an aqueous solution of 5 to about 30 percent by weight hydrochloric acid.

8. The composition defined in claim 6 wherein the acid comprises an aqueous solution containing about 5 to 15 percent by weight hydrochloric acid and about 2 to 15 percent by weight of hydrofluoric acid, or a mixture of hydrochloric acid and an ammonium fluoride or bifluoride salt that provides an aqueous solution containing about 5 to 15 percent by weight of hydrochloric acid and about 2 to 15 percent by weight of hydrofluoric acid.

9. The composition defined in claim 6 wherein the composition comprises about 1 equivelent of N,N-dimethylformamide for each equivalent of acid.

10. A method for acidizing a subterranean hydrocarbon-producing reservoir penetrated by a well having a bottom hole temperature of up to about 400° F. comprising injecting into said reservoir a solution of:
    (a) a proton-carrying mutual solvent comprising a tertiary carboxylic acid alkylated amide characterized by the formula:

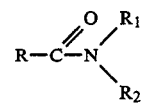

wherein R is a hydrogen or alkyl group containing 1 to about 8 carbon atoms, and $R_1$ and $R^2$ are the same or different alkyl groups containing 1 to about 8 carbon atoms;
    (b) at least about 5 percent by weight of a water-soluble acid selected from the group consisting of low molecular weight organic acids, hydrochloric acid, hydrofluoric acid, mixtures of hydrochloric acid and water-soluble ammonium fluoride or bifluoride salts, and mixtures thereof; and
    (c) about 100 to about 10,000 parts per million by weight of a water-soluble polymer having a molecular weight of 10,000 to 25,000,000 and selected from the group consisting of polyacrylamide and partially hydrolyzed polyacrylamide; wherein the solution contains proton-carrying mutual solvent in an amount about 0.5 to 2.5 eqivalents per equivalent of water-soluble acid.

11. The method defined in claim 10 wherein the tertiary carboxylic acid alkylated amide is selected from the group consisting of N,N-dimethylformamide, N,N-diethylformamide, N,N-dimethylacetamide, N,N-diethylacetamide, N,N-dipropylacetamide, N,N-dimethylpropionamide, and N,N-diethylpropionamide.

12. The method defined in claim 10 wherein the acid comprises an aqueous solution of about 5 to 30 percent by weight hydrochloric acid.

13. The method defined in claim 10 wherein the acid comprises an aqueous solution containing about 5 to 15 percent by weight of hydrochloric acid and about 2 to 15 percent by weight of hydrofluoric acid, or a mixture of hydrochloric acid and an ammonium fluoride or bifluoride salt that provides 5 to 15 percent by weight of hydrochloric acid and 2 to 15 percent by weight of hydrofluoric acid.

14. The method defined in claim 10 wherein the composition comprises about one equivalent of a tertiary carboxylic acid alkalated amide for each equivalent of acid.

15. The method defined in claim 10 wherein, following the injection of the mixture of a solution of a tertiary carboxylic acid alkylated amide and an aqueous solution of an acid or acids, there is injected as an afterflush an aqueous or oil solution containing about 5 to 35 percent by volume of a tertiary carboxylic acid alkylated amide, as defined in claim 10.

16. A method for acidizing a subterranean hydrocarbon-producing carbonate-containing reservoir with a retarded acidizing composition, which reservoir has a temperature of up to about 400° F. and is penetrated by a well, comprising injecting therein a solution of:
    (a) a proton-carrying mutual solvent comprising a tertiary carboxylic acid alkylated amide selected from the group consisting of N,N-dimethylformamide and N,N-diethylformamide;
    (b) at least about 5 percent by weight of a water-soluble acid selected from the group consising of hydrochloric acid, mixtures of hydrochloric and hydrofluoric acid and mixtures of hydrochloric acid and water-soluble ammonium fluoride or bifluoride salts; and
    (c) about 100 to about 10,000 parts per million by weight of a water-soluble polymer having a molecular weight of 10,000 to 25,000,000 and selected from the group consisting of polyacrylamide, and partially hydrolyzed polyacrylamide; wherein the solution contains proton-carrying mutual solvent in an amount about 0.5 to about 2.5 equivalents per equivalent of water-soluble acid.

17. The method defined in claim 16 wherein the acid comprises an aqueous solution of 5 to about 30 percent by weight hydrochloric acid.

18. The method defined in claim 16 wherein the acid comprises an aqueous solution containing about 5 to 15 percent by weight of hydrofluoric acid, or mixtures of hydrochloric acid and an ammonium fluoride or bifluoride salt that provide an aqueous solution containing about 5 to 15 percent by weight of hydrochloric acid and about 2 to 15 percent by weight of hydrofluoric acid.

19. The method defined in claim 16 wherein the composition comprises about 1 equivalent of a tertiary carboxylic acid alkylated amide for each equivalent of acid.

20. The method defined in claim 16 wherein the acid comprises hydrofluoric acid or a mixture of hydrochloric acid and either hydrofluoric acid or a water-soluble ammonium fluoride or bifluoride salt, and the injection of the retarded acidizing composition is either preceded by a slug of about 50 to 150 gallons per vertical foot of reservoir to be treated of an aqueous hydrochloric acid solution containing a tertiary carboxylic acid amide, as defined in claim 19, or followed by a slug of about 50 to 150 gallons per vertical foot of reservoir to be treated of an aqueous hydrochloric acid or oil solution containing a tertiary carboxylic acid alkylated amide, as defined in claim 19, or is both preceded and followed by said slugs.

21. A method for acidizing a subterranean hydrocarbon-producing reservoir penetrated by a well having a bottom hole temperature up to about 400° F., comprising the steps of:
    (a) injecting into said reservoir a solution comprising:
        (1) a proton-carrying mutual solvent comprising a tertiary carboxylic acid alkylated amide, characterized by the formula:

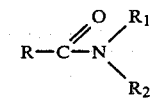

wherein R is hydrogen or an alkyl group, containing 1 to about 8 carbon atoms, and $R_1$ and $R_2$ are the same or different alkyl groups, containing 1 to about 8 carbon atoms; and
        (2) a water-soluble acid selected from the group consisting of low molecular weight organic acids, hydrochloric acid, hydrofluoric acid, mixtures of hydrochloric acid and water-soluble ammonium fluoride or bifluoride salts, and mixtures thereof; wherein the solution contains proton-carrying mutual solvent in an amount about 0.5 to about 2.5 equivalents per equivalent of water-soluble acid; and
    (b) subsequently, injecting an afterflush comprising an oil solution, containing about 5 to about 35 percent by volume of a tertiary carboxylic acid alkylated amide as defined in preceding subparagraph (a) (1).

22. A method for acidizing a subterranean hydrocarbon-producing, carbonate-containing reservoir with a retarded acidizing composition, which reservoir has a temperature of up to about 400° F. and is penetrated by a well, comprising injecting therein a solution of:
    (a) a proton-carrying mutual solvent comprising a tertiary carboxylic acid alkylated amide selected from the group consisting of N,N-dimethylformamide and N,N-diethylformamide; and
    (b) a water-soluble acid selected from the group consisting of hydrofluoric acid, mixtures of hydrochloric and hydrofluoric acids, and mixtures of hydrochloric acid and water-soluble ammonium fluoride or bifluoride salts; wherein the solution contains proton-carrying mutual solvent in an amount about 0.5 to about 2.5 equivalents per equivalent of water-soluble acid; in which method the injecting is followed by injecting a slug of about 50 to 150 gallons per vertical foot of reservoir to be treated, of an oil solution, containing the tertiary carboxylic acid alkylated amide described in preceding subparagraph (a).

* * * * *